(12) United States Patent
Chow et al.

(10) Patent No.: US 9,239,384 B1
(45) Date of Patent: Jan. 19, 2016

(54) TERRAIN DETECTION AND CLASSIFICATION USING SINGLE POLARIZATION SAR

(71) Applicant: Sandia Corporation, Albuquerque, NM (US)

(72) Inventors: James G. Chow, Sandia Park, NM (US); Mark W. Koch, Albuquerque, NM (US)

(73) Assignee: Sandia Corporation, Albuqerque, NM (US)

( * ) Notice: Subject to any disclaimer, the term of this patent is extended or adjusted under 35 U.S.C. 154(b) by 0 days.

(21) Appl. No.: 14/519,278

(22) Filed: Oct. 21, 2014

(51) Int. Cl.
*G06K 9/00* (2006.01)
*G01S 13/90* (2006.01)
*G06K 9/46* (2006.01)

(52) U.S. Cl.
CPC ........... *G01S 13/9035* (2013.01); *G06K 9/0055* (2013.01); *G06K 9/00476* (2013.01); *G06K 9/00536* (2013.01); *G06K 9/46* (2013.01); *G06K 2009/4666* (2013.01)

(58) Field of Classification Search
None
See application file for complete search history.

(56) References Cited

U.S. PATENT DOCUMENTS

| | | | |
|---|---|---|---|
| 2014/0152486 A1* | 6/2014 | Apostolos | G01S 13/885 342/22 |
| 2015/0198711 A1* | 7/2015 | Zeng | G01S 13/726 342/59 |

OTHER PUBLICATIONS

Bickel, D, "SAR Image Effects on Coherence and Coherence Estimation", Sandia Labs Report SAND2014-0369, Jan. 2014, 55 pages.
Bouaraba, et al., "Robust Techniques for Coherent Change Detection Using Cosmo-Skymed SAR Images", Progress in Electromagnetics Research M, vol. 22, 2012, pp. 219-232.
Luo, et al., "Coherence Characteristics of Radar Signals from Rough Soil", Progress in Electromagnetics Research, Pier 31, 2001, pp. 69-88.

* cited by examiner

*Primary Examiner* — Stephen R Koziol
*Assistant Examiner* — Amandeep Saini
(74) *Attorney, Agent, or Firm* — Medley, Behrens & Lewis, LLC

(57) ABSTRACT

The various technologies presented herein relate to identifying manmade and/or natural features in a radar image. Two radar images (e.g., single polarization SAR images) can be captured for a common scene. The first image is captured at a first instance and the second image is captured at a second instance, whereby the duration between the captures are of sufficient time such that temporal decorrelation occurs for natural surfaces in the scene, and only manmade surfaces, e.g., a road, produce correlated pixels. A LCCD image comprising the correlated and decorrelated pixels can be generated from the two radar images. A median image can be generated from a plurality of radar images, whereby any features in the median image can be identified. A superpixel operation can be performed on the LCCD image and the median image, thereby enabling a feature(s) in the LCCD image to be classified.

20 Claims, 8 Drawing Sheets

TERRAIN DETECTION AND CLASSIFICATION USING SINGLE POLARIZATION SAR

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

Conventional techniques for terrain classification include the use of radar cross section (RCS) backscatter for single polarization synthetic aperture radar (SAR) or examining the scattering physics using multiple-polarization SAR. There are a number of issues to be addressed when solely relying on radar backscatter. For a single-polarization radar operating over a fixed range of frequencies, terrain backscatter is strongly dependent on not only the material itself, but also an antenna to terrain geometry during radar imaging. Furthermore, the moisture content of the material, such as soil, may change and, hence, impact the radio frequency (RF) reflectivity. The result is different types of terrain may exhibit similar radar backscatter, thus leading to detection and classification ambiguity. Another approach for performing terrain classification using SAR images requires multi-polarization SAR image systems, which are often unavailable.

SUMMARY

The following is a brief summary of subject matter that is described in greater detail herein. This summary is not intended to be limiting as to the scope of the claims.

Various technologies presented herein relate to utilizing coherent change detection (CCD) to detect features having a manmade surface (e.g., a paved road) in contrast to features having a natural surface (e.g., a dirt track). In an embodiment, a pair of radar images (e.g., SAR images, single polarization SAR images) are selected from a plurality of radar images, whereby the plurality of radar images are of the same scene collected over a sufficiently long temporal period such that temporal decorrelation occurs, particularly for any natural surfaces and/or features in the scene. The long-term, temporal separation between the pair of SAR images engenders temporal decorrelation across the scene except where terrain features are essentially invariant to time, such as manmade features (e.g., paved roads, buildings, etc.). The respective pixels in the first SAR image and the second SAR image are correlated (or alternatively decorrelated) to form a "long term CCD" image (LCCD image).

In a further embodiment, the plurality of radar images can be registered to identify RCS's of the different types of terrains and objects in the scene to be identified. A median image (e.g., a median RCS image) can be computed from the plurality of radar images.

Detection of specific features (both manmade and natural) in both the median image and the LCCD image can be performed by initially conducting a segmentation process based on a formation of "superpixels" in the median image and superpixels in the LCCD image. The segmentation process groups pixels in the LCCD image and median image into homogeneous segments of similar size.

Specific features in the respective superpixel segments in the LCCD image and the median image can be classified based upon multiple class models. One model for each class of interest and image type. For example, a classifier can be utilized to perform "goodness of fit" determinations of various structures and features in a superpixel segment in the LCCD image, and also for the various structures and features in a superpixel segment in the median image. The "goodness of fit" match score is referred to herein as a "test score." A first probability score can be determined for the LCCD image superpixel exceeding the test score and a second probability score can be determined for the median image superpixel exceeding the test score. Assuming a first superpixel from the LCCD image and a second superpixel from the median image correspond to the same image pixel locations, a probabilistic fusion method can be utilized to fuse the first probability score and the second probability score to enable classification of the first superpixel and the second superpixel as depicting a paved road, while rejecting false alarms resulting from such classes as other manmade objects, hard packed desert, a dirt track, etc.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
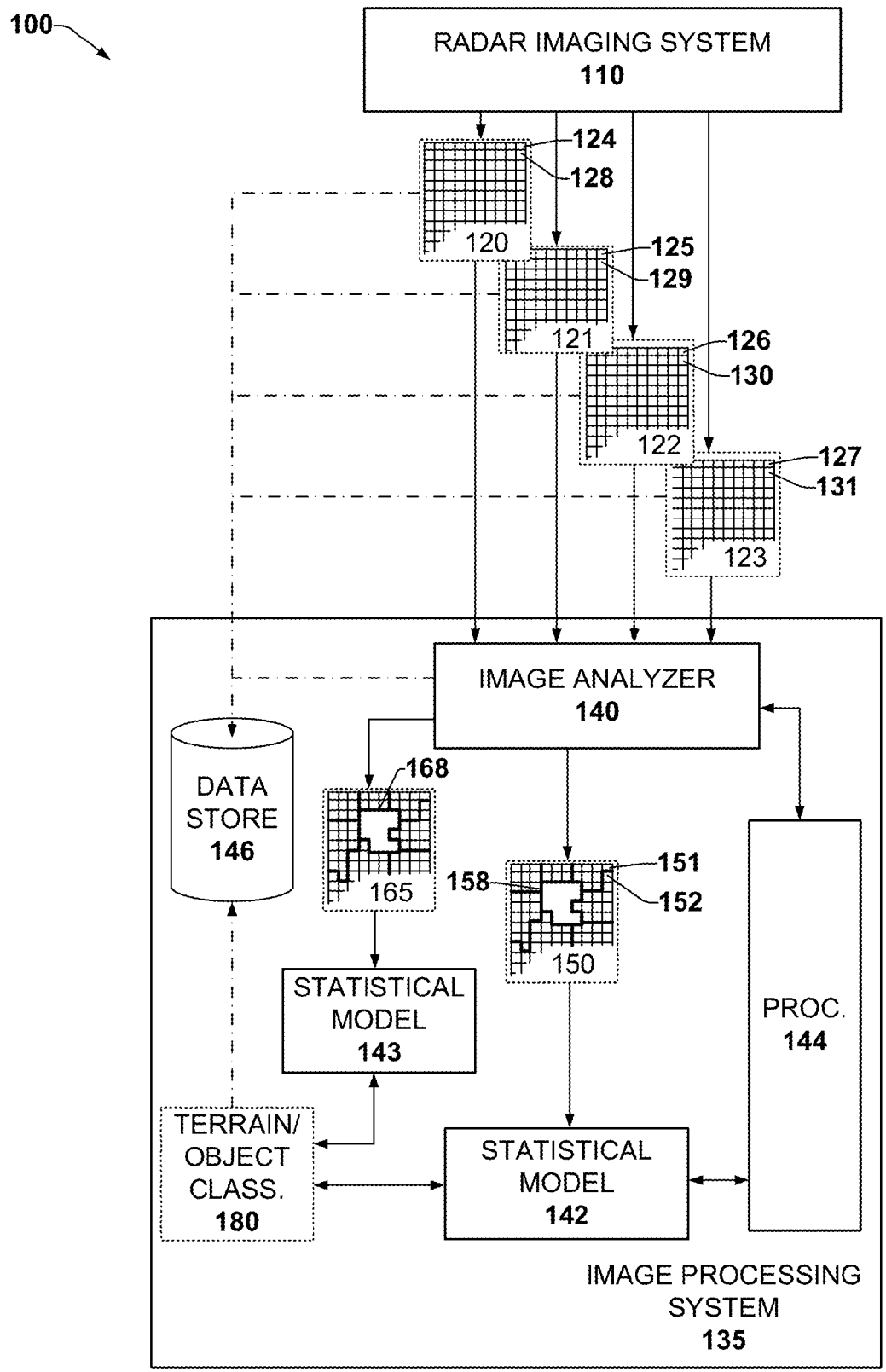
FIG. 1 illustrates a system for discriminating manmade and natural features in a scene, according to an embodiment.

Various technologies pertaining to discriminating manmade and natural features in a terrain, as imaged by a radar system, are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Further, the term "or" is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an"

as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference.

As previously mentioned, conventional techniques for utilizing SAR to determine terrain features can be impacted by criteria such as geology, geometry, soil conditions, etc. CCD can be utilized to address such issues. CCD imagery from a single polarization SAR can be utilized to determine various features of a terrain, for example, whether a thoroughfare is a paved road or a dirt road.

It is to be appreciated that while the term "feature" is used herein to describe a contour, profile, region, etc., of a terrain, the term feature is also directed towards a feature of a class, such as a shadow on the terrain.

SAR CCD product measures total scene coherence. As shown in Eqn. 1, total scene coherence, $\mu$, is a function of differences in time ($\mu_{temporal}$), geometry ($\mu_{geometry}$), differences in signal-to-noise ratio ($\mu_{SNR}$), and processing errors ($\mu_{proc}$):

$$\mu_{total} = \mu_{temporal} \cdot \mu_{geometry} \cdot \mu_{SNR} \cdot \mu_{proc} \qquad \text{Eqn. 1}$$

Ideally, a reference radar image and a match radar image will be collected at identical geometries. Differences in geometry impact the overall coherence. In particular, coherence is sensitive to differences in grazing angle, while differences in squint angle can result in different range layover directions. Furthermore, uncompensated sensor motion can impact the coherence. Processing errors include, but are not limited to, errors arising from image formation, mismatched impulse responses, autofocus, and image registration. By limiting or tempering the anomalous sources of coherence loss, or at least detect when they are present or not, it is possible to exploit the ability of a CCD process to discriminate surfaces with low temporal changes in coherence from those with higher change.

Temporal coherence ($\mu_{temporal}$) may be affected by weather effects such as rain or wind, scene changes from actual activity, changes in vegetation, etc. Certain categories of terrain are more resilient to temporal decorrelation than others. These include paved roads, manmade structures, vegetation-free natural formations such as rocks and/or gravel, etc. Identification of roads can be utilized for image catalogs and databases, as well as geo-registration with maps containing road networks. Any LCCD images registered to these road networks can then be registered to one another.

Various embodiments presented herein relate to utilizing CCD to detect paved roads. In an embodiment, a pair of SAR images are selected, whereby the pair of SAR images are of the same scene collected over a sufficiently long temporal period such that temporal decorrelation occurs for most surfaces. The long-term, temporal separation between the pair of SAR images engenders temporal decorrelation across the scene except where terrain features are essentially invariant to time, such as those from paved roads and static-manmade structures.

FIG. 1 illustrates a system 100, whereby the system 100 can be a CCD system configured to compare information in two radar images (e.g., two SAR images) to identify constituents of a scene (e.g., a terrain) captured in the two radar images, whereby the constituents can be manmade structures or naturally occurring features.

The system 100 includes a radar imaging system 110, whereby the radar imaging system 110 can be a SAR imager, such as a single polarization SAR imager. The radar imaging system 110 can generate a plurality of radar images 120-123, wherein the plurality of radar images 120-123 include a first radar image through to an nth radar image (where n is a positive integer greater than two). It is assumed that the plurality of the images view the same location using approximately similar radar geometries. The radar imaging system 110 can generate the first radar image 120 at a first instant in time. At a subsequent instant in time, the radar imaging system 110 can further generate the second radar image 121. At a further instant in time, the radar imaging system 110 can generate a third radar image 122. At a further instant in time the radar imaging system 110 can generate the nth radar image 123. As further described herein, the first radar image 120 can act as a reference image, while any of the radar images 121-123 can be selected to act as a match image. The first radar image 120 can be paired with any of radar images 121-123 to form a LCCD image.

As previously mentioned, the plurality of radar images 120-123 can be generated for the same scene. Accordingly, a first pixel 124, 125, 126, and 127 in each of the respective radar images 120-123 can correspond to a common first target region in the scene, and further, a second pixel 128, 129, 130, and 131 in each of the respective radar images 120-123 can correspond to a common second target region in the scene.

In an aspect, a temporal period between capture of the first radar image 120 and capture of the second radar image 121 (and subsequently the third radar image 122, and the nth radar image 123) is of a sufficiently long duration such that temporal decorrelation occurs for a plurality of surfaces of the structures or features in the two radar images 120 and 121 (and radar images 122 and 123). The long-term, temporal separation between the pair of radar images 120 and 121 (and also radar images 122 and 123) engenders temporal decorrelation across the scene except where terrain features are essentially invariant to time, such as manmade features (e.g., paved roads) and static manmade structures. The invariant features can be considered to be temporally correlated.

Per Eqn. 1, apart from the $\mu_{temporal}$ component, $\mu_{total}$ can also be affected by $\mu_{geometry}$ during image capture, $\mu_{SNR}$, and $\mu_{processing}$. Accordingly, as previously mentioned, to minimize the effects of $\mu_{geometry}$, $\mu_{SNR}$, and $\mu_{processing}$, the radar images 120-123 are desirably generated under the same conditions with regard to antenna alignment to the terrain (e.g., grazing angle), radar velocity, with the transmitted radar signals utilized to form the radar images 120-123 having the same frequency (e.g., center frequency), wavelength, image processing, etc.

The radar system 100 can further include an image processing system 135, whereby the image processing system 135 can be configured to receive the radar images 120-123. The image processing system 135 can include an image analyzer 140, a LCCD statistical model component 142, a median statistical model component 143, a processor 144, and a data store 146. The image analyzer 140, the LCCD statistical model component 142 and/or the median statistical model component 143 can be standalone components, or the image analyzer 140 and/or the statistical model component 142 can operate in conjunction with the processor 144. Further, the data store 146 can include any of the radar images 120-123 (and also any of the following, as further described herein, a LCCD image 150, a median image 165, information regarding a superpixel 158, information regarding a superpixel 168, etc.) etc.

The image analyzer component 140 can be configured to receive the radar images 120-123. The image analyzer component 140 can be further configured to generate a LCCD image 150, based at least in part upon a combination of data between any of the first radar image 120, the second radar image 121, the third radar image 122, and the nth radar image 123. For example, the LCCD image 150 can be generated based upon a comparison of a respective phase and/or energy of respective signals which formed the respective pixels 124-127 and 128-131 in the radar images 120-123. Thus, to enable comparison between the radar images 120-123, the various pixels (e.g., pixels 124-127 and pixels 128-131) relating to common targets can be coherently aligned during analysis by the image analyzer component 140.

Figure 2:
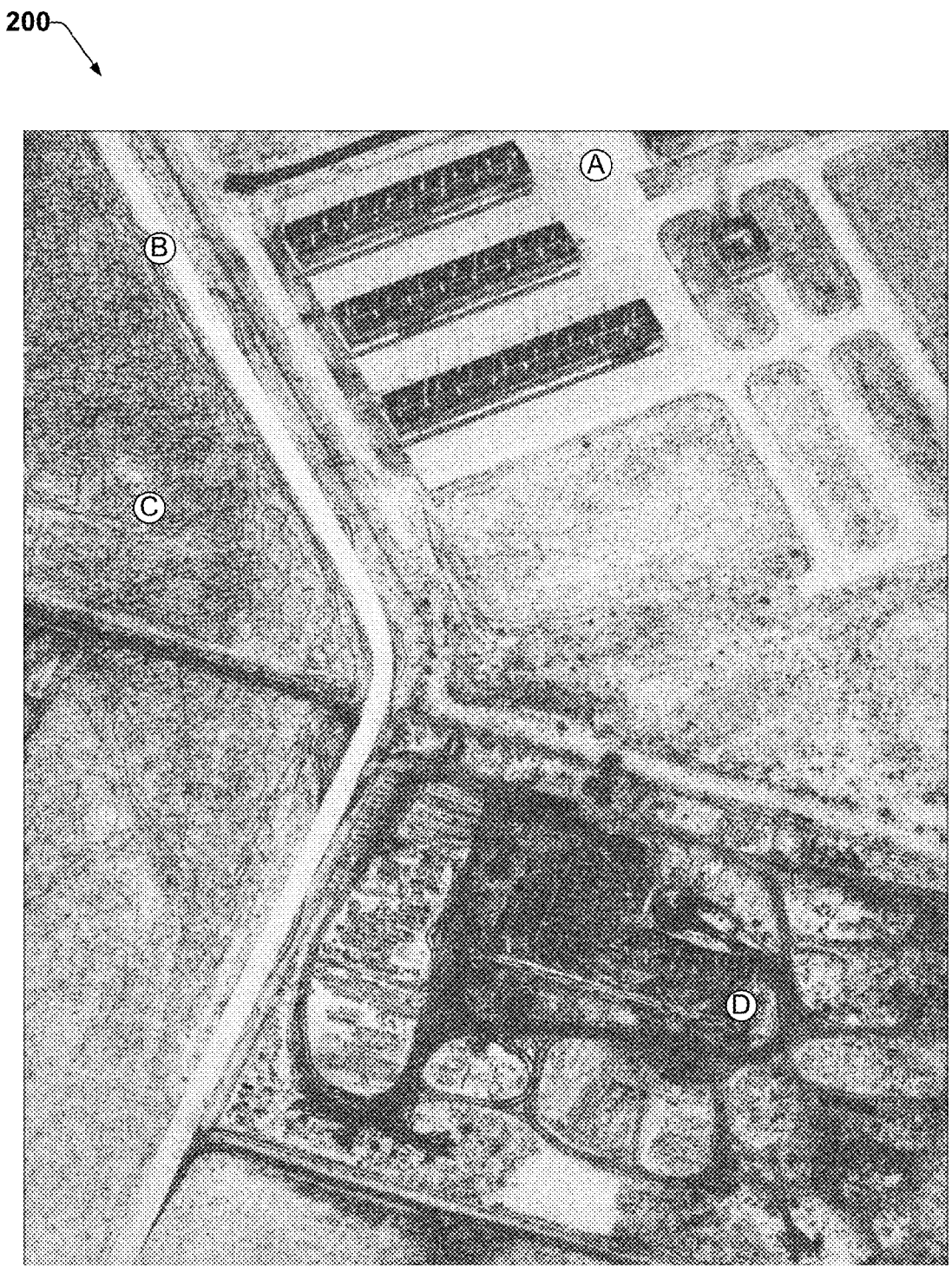
FIG. 2 illustrates an image product, according to an embodiment.
Figure 3:
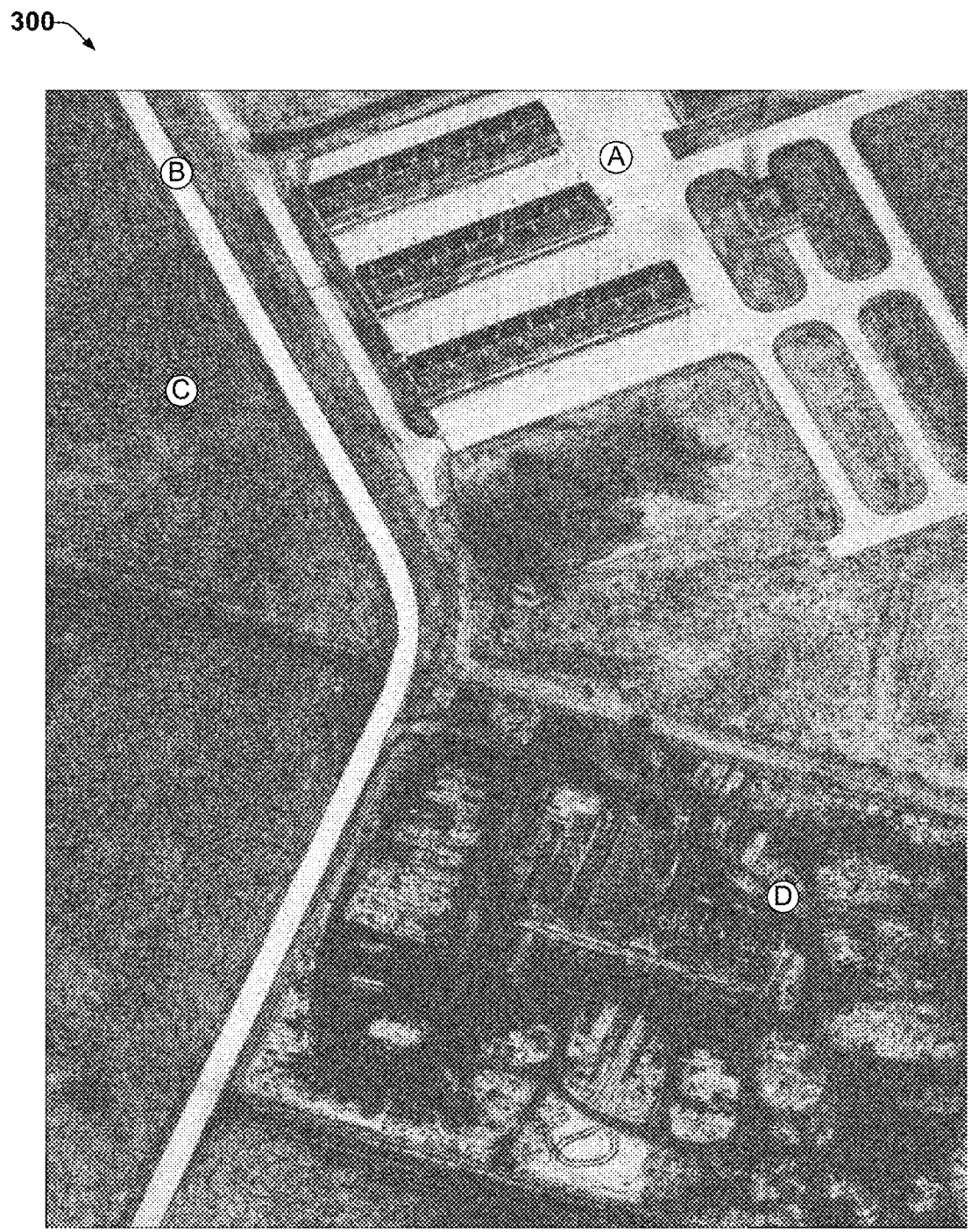
FIG. 3 illustrates an image product, according to an embodiment.
Figure 4:
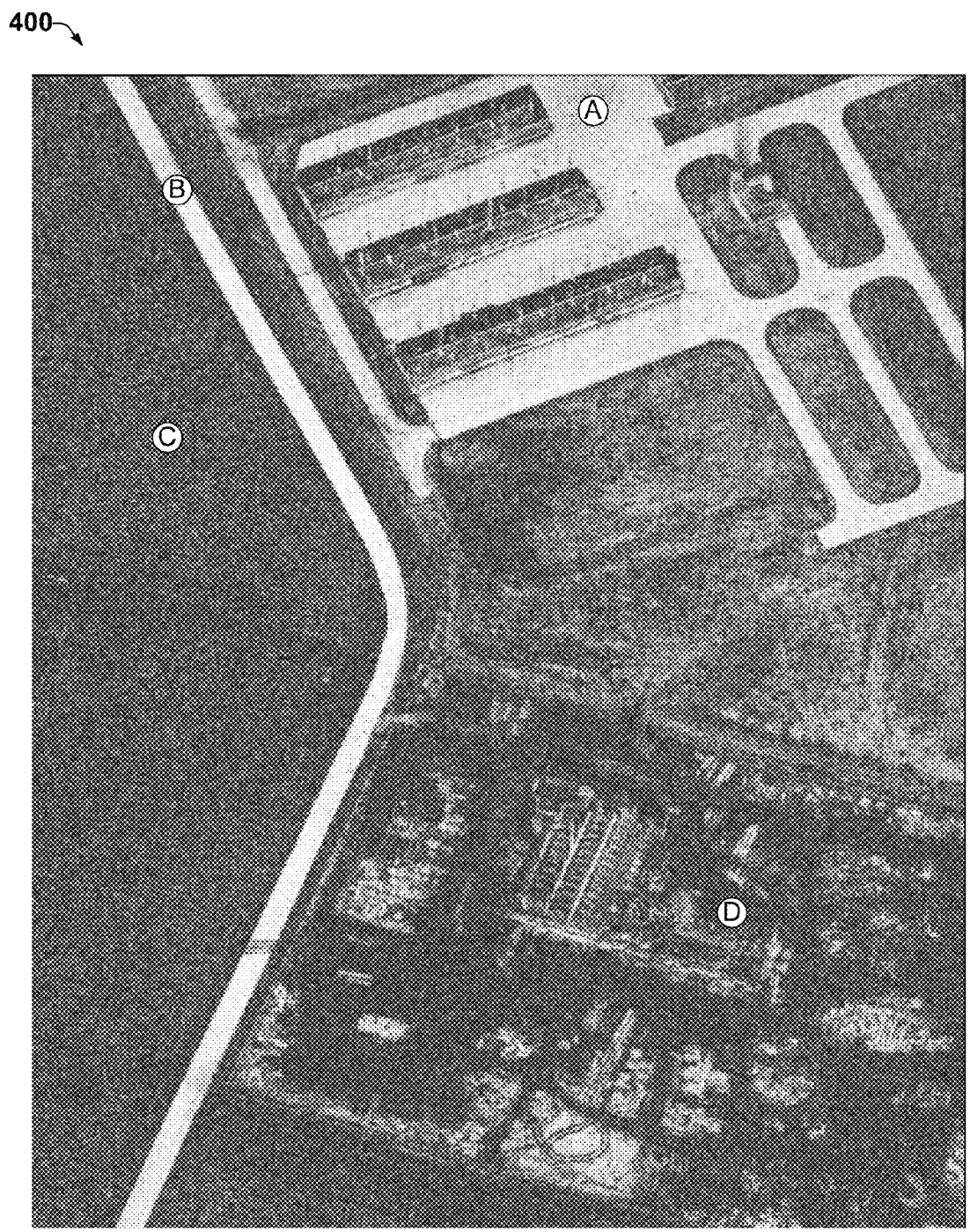
FIG. 4 illustrates an image product, according to an embodiment.

The LCCD image 150 is a "long term" CCD image, whereby the time interval of the "long term" is a function of the time at which the radar images 120-123 were respectively generated (as further described with regard to FIGS. 2-4). The LCCD image 150 can be generated from a pair of images in the radar images 120-123 and respective pixel pairings therein. For example, a first pixel 151 in the LCCD image 150 can be based upon a comparison of a value of a group of pixels centered at pixel 124 in the first radar image 120 with a value of an identically sized and oriented group of pixels centered at pixel 125 in the second radar image 121. Further, a pixel 152 in the LCCD image 150 can be based upon a comparison of a value of a group of pixels centered at pixel 128 in the first radar image 120 with a value of an identically sized and oriented group of pixels centered at pixel 129 in the second radar image 121.

Similar pixel comparisons between pairs of images can be undertaken where the LCCD image 150 is formed with a comparison of the content of the first radar image 120 and the content of the third radar image 122 (e.g., a value of a group of pixels centered at pixel 124 versus a value of an identically sized and oriented group of pixels centered at the pixel 126, and a value of a group of pixels centered at the pixel 128 versus a value of an identically sized and oriented group of pixels centered at the pixel 130, etc.), the nth radar image 123, etc. In an embodiment, to maximize the degree of decorrelation versus correlation of respective areas of a scene, a first radar image (e.g., the first radar image 120) and a last radar image (e.g., the nth radar image 123) can be chosen from the plurality of radar images available, thereby maximizing the temporal duration between the images and the data contained therein. It is to be appreciated that the size, shape, and orientation of the respective group of pixels utilized in forming the LCCD image 150 can be arbitrary. Once the LCCD image 150 has been generated, various features included in the LCCD image 150 can be classified and/or identified.

The sequence of radar images 120-123 can undergo registration of the respective radar cross sections (RCSs) of the different types of terrains and objects which appeared in the scene captured by the images 120-123. Accordingly, a median image 165 can be formed from the sequence of radar images 120-123. In an aspect, the median image 165 is generated to be robust to outlier pixels caused by misregistration, miscalibration, SNR, processing errors, etc. Hence, the median image 165 can be generated from the entire sequence of images 120-123, while the LCCD image 150 can be generated from a pair of images in the sequence of images 120-123.

To facilitate further analysis and determination of the manmade structures and/or naturally occurring features which may be present in the LCCD image 150 (e.g., visible to the radar in the terrain from which the radar images 120-123 were collected) a "superpixel" process can be performed by the image analyzer component 140. The image analyzer component 140 can segment the median image 165 into a first plurality of superpixels, whereby the first plurality of superpixels can include a first superpixel 168. The image analyzer component 140 can further segment the LCCD image 150 into a second plurality of superpixels, whereby the second plurality of superpixels can include a second superpixel 158. Segmentation of the LCCD image 150 can be performed in accordance with the segmentation of the median image 165, e.g., segmentation can be based upon common regions having the common RCS. The superpixels 158 and 168 can be homogeneous segments of a similar size. In an aspect, the superpixels 158 and 168 can comprise of pixel clusters of about 500 to 600 pixels, or N pixels (where N is a positive integer greater than zero) of irregular shape. The shape of a superpixel can be constrained by a natural region boundary found in the radar images 120-123. For example, the natural region boundary can be a paved road surface transitioning to a grassy embankment. To facilitate probabilistic fusion of respective P-values, as further described herein, the superpixel segmentations utilized in the segmentation of the LCCD image 150 and the corresponding segmentation of the median image 165 should be identical in the two images 150 and 165.

As shown in FIG. 1, the LCCD statistical model component 142 can be operatively coupled to the image analyzer 140, whereby the LCCD statistical model component 142 can be configured to apply one or more statistical methods or operations to content of the superpixel 158. Further, the median statistical model component 143 can be operatively coupled to the image analyzer 140, whereby the median statistical model component 143 can be configured to apply one or more statistical methods or operations to content of the superpixel 168. The image analyzer 140, in conjunction with the LCCD statistical model component 142 and the median statistical model component 143, can be configured to apply classifiers to the superpixels 158 and 168 to facilitate identification and subsequent fusion of product pixels in the superpixel 158 and the superpixel 168.

It is to be appreciated that while the LCCD statistical model component 142 and the median statistical model component 143 are presented as single models, the LCCD statistical model component 142 and the median statistical model component 143 can include a plurality of models enabling a particular image to be compared with model data of a plurality of classes or features. For example, the LCCD statistical model component 142 can include a pavement model enabling classification of the LCCD image 150 with a thoroughfare having a manmade surface. Alternatively, the LCCD statistical model component 142 can include a dirt road (or dirt track) model enabling classification of the LCCD image 150 with a thoroughfare having a natural surface. Hence, the LCCD statistical model component 142 can include models of all surfaces, structures, etc., for which an LCCD image 150 (and its composite superpixels) is to be classified.

Similarly, the median statistical model component 143 can include a similar plurality of models to facilitate classification of a median image 165 (and its composite superpixels) with regard to the surfaces, structures, etc., which may be present in the median image 165. The median statistical model component 143 can include models for dirt road, natural surface, etc. The models in the LCCD statistical model component 142 can be configured to enable classification of the LCCD image 150, and the models in the median statistical model component 143 can be configured to enable classification of the median image 165.

In an embodiment, the statistical model components 142 and 143 can utilize a learning methodology, such as supervised learning. For example, a "goodness of fit", nonparametric, two-sample classifier can be utilized for class homogeneity of the various structures represented in the superpixel 158 and the superpixel 168. Any suitable classifier can be utilized, e.g., a Kolmogorov-Smirnov (KS) classifier. In an embodiment, the classifier can assume that any pixels underneath the superpixels 158 and 168 are independent (which is not the case for SAR imagery). In a further embodiment, a "leave-one-out" training methodology can be utilized, such that a set of correction factors that can compensate for dependent pixels for any superpixel size can be developed.

The image analyzer 140 and the statistical model components 142 and 143 can be further configured such that any P-values generated during the classification of the superpixel 158 and the superpixel 168 can be fused together using probabilistic fusion methods. Further, an in-class terrain probability can be computed by the image analyzer 140, wherein the in-class terrain probability can identify a probability of a feature being in the superpixel 158 and the superpixel 168. In an embodiment, the in-class terrain probability can be computed by approximating a gamma distribution resulting from the probabilistic fusion with a normal distribution, whereby the image analyzer 140 can utilize a Bayesian methodology (or any other suitable methodology) to determine the in-class terrain probability. The probability fusion process can classify such features as paved roads while rejecting false alarms resulting from such classes as other manmade objects, hard packed desert, etc.

As shown in FIG. 1, once one or more pixels have been classified by the image analyzer 140, the one or more pixels can be tagged with a terrain/object identifier 180 (per the in-class terrain probability methodology). The image analyzer 140 can perform the tagging operation. Accordingly, the terrain/object identifier 180 can be utilized to identify corresponding pixels in any of the first radar image 120, the second radar image 121, the third radar image 122, the nth radar image 123, the LCCD image 150, and/or the median image 165. Thus, per the various operations performed by the various components included in system 100, knowledge of the terrain can be supplemented.

For example, when the nth radar image 123 is generated by the radar system 110, the previously acquired knowledge conveyed by the terrain/object identifier 180 can be applied to the pixels included in the nth radar image 123.

FIGS. 2-4 present three different LCCD images 200-400, whereby the LCCD images 200-400 can be considered comparable to the LCCD image 150. The LCCD images 200-400 were generated based upon performing a coherence study between an original image (e.g., the first image 120) and a subsequently taken image (e.g., the second image 121). LCCD image 200 is generated based upon a first image, and a subsequent second image taken 7 days later. LCCD image 300 is generated based upon a first image and a subsequent second image taken 39 days later. LCCD image 400 is generated based upon a first image and a subsequent second image taken 82 days later. To facilitate understanding, four regions A-D have been indicated on images 200-400, whereby A=a service road, B=a road, C=natural terrain, D=a combination of natural and manmade terrain.

Per the CCD approach utilized in the generation of the LCCD images 200-400, where a high degree of decorrelation (e.g., high phase difference) exists between pixels in a first image and second image, the corresponding pixel in a LCCD image will be dark. Accordingly, if there is a high degree of correlation (e.g., small difference in phase) between pixels in a first image and second image, the corresponding pixel in a LCCD image will be bright.

The various embodiments presented herein take advantage of the high degree of decorrelation that can occur over an extended period of time for natural features, while a low degree of decorrelation for a manmade feature may occur over the same time period. For example, as a natural feature changes state over time (e.g., moisture content, sands shifted, covered with vegetation at one time and no vegetation at another, etc.) the natural feature engenders natural clutter through a difference in radar backscatter (and associated phase shift) encountered at a first instance of image formation (e.g., first image 120) compared with a second instance of image formation (e.g., any of images 121-123). However, over the same time period, a manmade feature, such as a paved road, will exhibit a lesser degree of backscatter variation between the first image and the second image owing, in part, to the stability of any materials from which the manmade feature is fabricated, e.g., a road formed from asphalt and/or concrete.

Accordingly, comparison of the LCCD images 200, 300, and 400 illustrates the correlation stability of manmade features A and B, compared with the increase in decorrelation over time for the natural features C and D. For example, in the LCCD image 200 the degree of contrast across the image is fairly flat (the buildings at the top of the image and what appears to be well traveled dirt tracks in the lower right). Per LCCD image 300, as the time between taking the images is extended, the manmade features A and B are beginning to be noticeable against the natural features C and D, whereby, with regard to feature D, the natural features in that region are beginning to take a constant degree of contrast. It is to be noted that as the dirt tracks in region D are becoming more and more well-traveled over time, and accordingly, any material from which they are formed (e.g., dirt, gravel, pebbles, etc.) undergoes increased disturbance, the dirt tracks tend to a same level of decorrelation as the surrounding natural areas in region D. Hence, by utilizing CCD of a long duration between imaging, it is possible to identify an area comprising one or more dirt tracks compared to a thoroughfare having a manmade surface. This is further exemplified in the LCCD image 400, whereby the manmade features of the service road A and the road B are readily apparent against the natural terrain C and the combination of natural and manmade terrain, region D. The well-traveled dirt tracks in region D are no longer discernible against the surrounding natural features, and have a greyscale as consistent across terrain D. Hence, even though the disturbance of the dirt tracks in region D is a function of human activity, the decorrelation effect renders the dirt tracks with a greyscale similar to that of a natural feature. However, the road B is readily discernible as the asphalt and/or concrete from which it is constructed is still in good condition.

Figure 5:
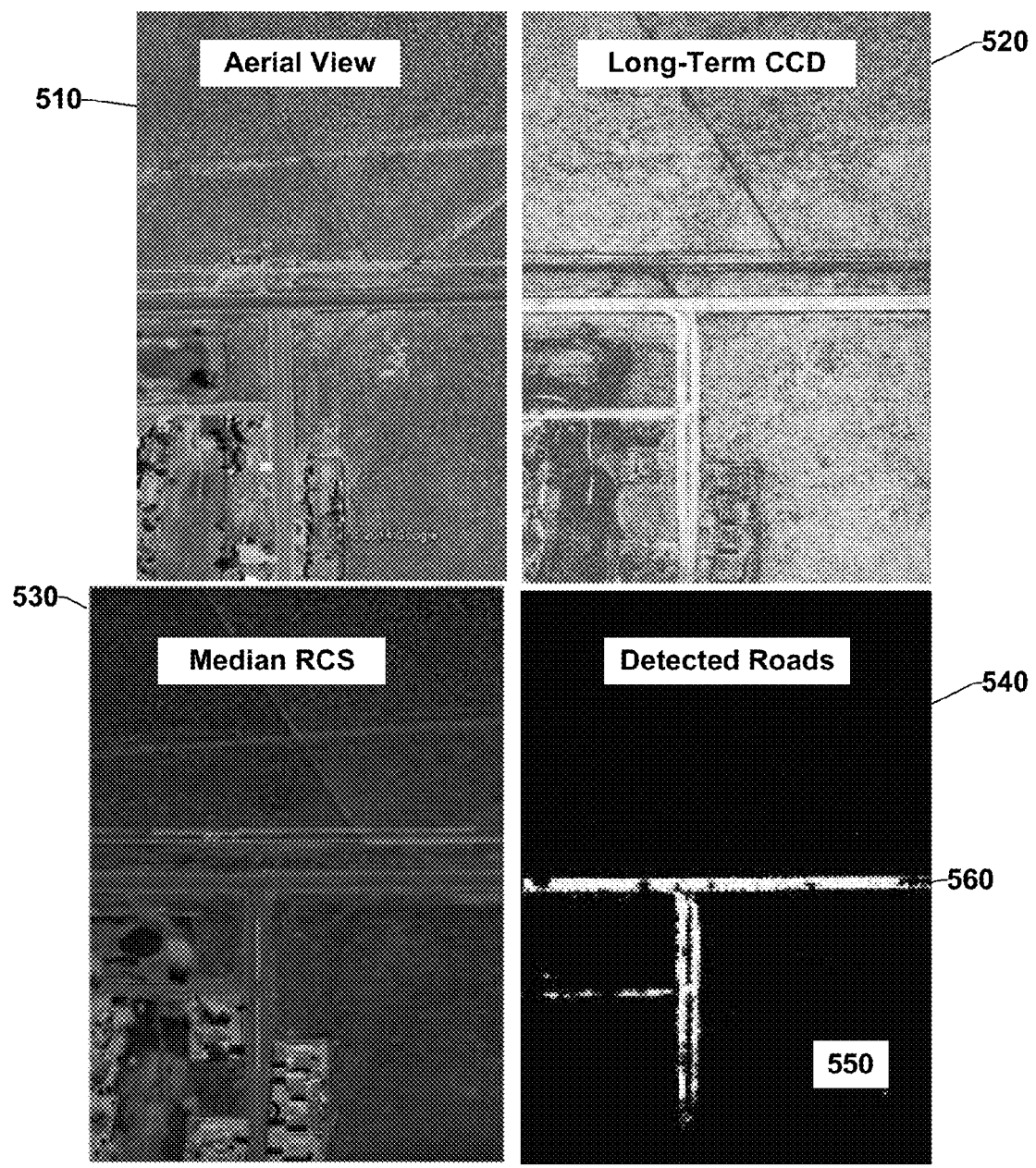
FIG. 5 illustrates a plurality of images relating to detecting a feature in a radar image, according to an embodiment

The previously described embodiments were utilized to form the respective images 510-540 presented in FIG. 5. Image 510 is an aerial view of a road network. Image 520 is a LCCD image, which has been formed using a process similar to that utilized to form the LCCD image 150. Image 530 is a median image (e.g., a median RCS image 165), whereby the median image can be formed from a sequence of short-term SAR images (e.g., images 120-123) as previously described. Image 540 is an image whereby the roads have been classified and/or identified (e.g., have been classified with the terrain/object classifier 180). As shown, a plurality of dark regions 550 have been identified owing to the dark regions have not been classified as a paved surface, and hence have been classified as 'other', 'unknown', etc. Alternatively, a road 560 has been identified owing to a plurality of superpixels being classified as a paved surface, based in part, on the light regions being previously determined to comprise of correlated pixels.

Figure 6:
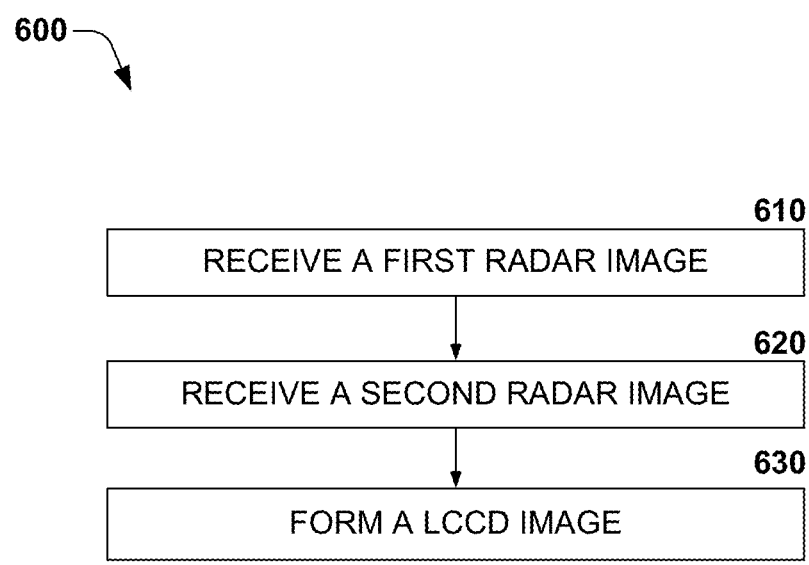
FIG. 6 is a flow diagram illustrating an exemplary methodology for forming a LCCD image.
Figure 7:
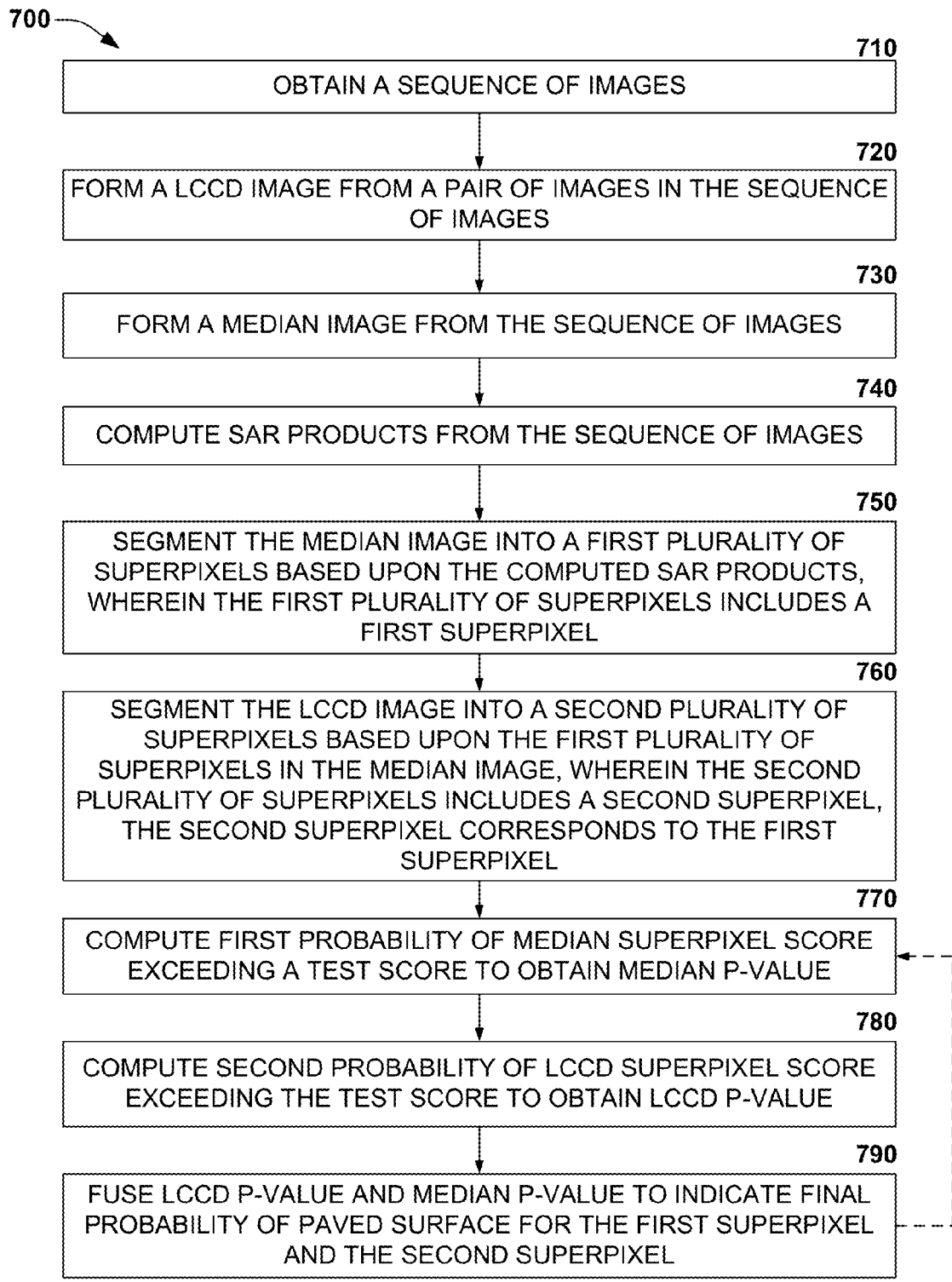
FIG. 7 is a flow diagram illustrating an exemplary methodology identifying a class in an LCCD image.

FIGS. 6 and 7 illustrate exemplary methodologies relating to discriminating manmade and natural features in a terrain.

While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement the methodologies described herein.

FIG. 6 illustrates a methodology 600 relating to generation of a radar image based on correlating/decorrelating corresponding pixels in a pair of radar images. As previously described, data relating to a first pixel in a first radar image can be correlated with data relating to a second pixel in a second radar image, to facilitate formation of a LCCD image.

At 610, a first radar image can be received at an image analyzer, wherein the first radar image can be received from a radar imaging system. As previously mentioned, the first radar image can be a SAR image, e.g., a single polarization SAR image, whereby the first radar image is of a particular scene having a terrain comprising a natural feature(s) and a manmade feature(s).

At 620, a second radar image can be received at the image analyzer. The second radar image can also be a SAR image, e.g., a single polarization SAR image, wherein the second radar image is also of the particular scene captured in the first radar image. The first SAR image is generated at a first time and the second SAR image is generated at a second time, wherein a time between the first time and the second time is of sufficient temporal duration such that pixels in the first radar image can be correlated with pixels in the second radar image when a feature is manmade, and the pixels in the first radar image are decorrelated with pixels in the second radar image when the feature is natural At 630, a LCCD image can be generated based upon a CCD operation being performed based upon the first radar image and the second radar image. As previously described, a natural feature is likely to exhibit a higher degree of decorrelation as a function of time compared with a manmade feature having a stable surface. The LCCD image can be generated by the image analyzer.

FIG. 7 illustrates a methodology 700 relating to classifying a feature in a LCCD image based in part upon the feature being identified in a median image.

At 710, a sequence of radar images can be obtained. The sequence of radar images depict a common scene. The sequence of radar images can be generated by a radar imaging system (e.g., a SAR system) and can be received by an image analyzer. The sequence of radar images can depict respective RCSs of the different types of features (e.g., terrain(s), structure(s), etc.) which may be captured in the previously described LCCD image.

At 720, a pair of radar images in the sequence of radar images can be processed to form a LCCD image, as previously described.

At 730, a median image can be formed from the sequence of radar images.

At 740, a plurality of SAR products can be identified for any of the sequence of pixels, the median image, and/or the LCCD image. The SAR products can be determined based upon the respective RCSs of the different types of features depicted in the sequence of radar images. For example, a road, a dirt track, a building, a manmade structure, a natural formation, etc., can be identified in the SAR products. The SAR products can be identified by the image analyzer.

At 750, the SAR products can be utilized to segment the median image into a first plurality of superpixels, whereby the first plurality of superpixels include a first superpixel. The image analyzer component can segment the median image into the first plurality of superpixels.

At 760, the LCCD image can be segmented into a second plurality of superpixels, whereby the second plurality of superpixels includes a second superpixel. The segmentation of the LCCD image can be performed in accordance with the segmentation of the median image. For example, each of the segments in the second plurality of segments in the LCCD image can be homogeneous and of a same or similar size to a corresponding homogeneous segment in the first plurality of segments in the median image.

At 770, a probability (a median P-value) of the first superpixel in the median image exceeding a test score can be computed. The probability can be a function of a distance between the first superpixel and a class model for the median image. In an embodiment, the distance can be based upon any suitable classifier, such as a KS classifier. A class model can be utilized for each and every class that may be encountered in the scene captured by the median image. For example, classifying the median image with a pavement model, classifying the median image and a dirt track model, etc.

At 780, a probability (a LCCD P-value) of the second superpixel in the LCCD image exceeding the test score can be computed. The probability can be a function of a distance between the second superpixel and a class model for the LCCD image, e.g., such as the KS classifier. A class model can be utilized for each and every class that may be encountered in the scene captured by the LCCD image. For example, classifying the LCCD image with a pavement model, classifying the LCCD image and a dirt track model, etc.

At 790, the median P-value and the LCCD P-value can be fused to enable an in-class terrain probability to be computed, and accordingly, a determination of whether the first superpixel and the second superpixel indicate the portion of terrain represented thereby is a manmade surface, e.g., a paved road, or not. At 790, the flow can return to 770 wherein the next superpixel in the median image can have a P-value generated and the corresponding superpixel in the LCCD image can have a P-value generated, and subsequently fused to enable classification. The flow can loop through acts 770-790 until all of the first plurality of superpixels in the median image and corresponding second plurality of superpixels in the LCCD have been classified.

Figure 8:
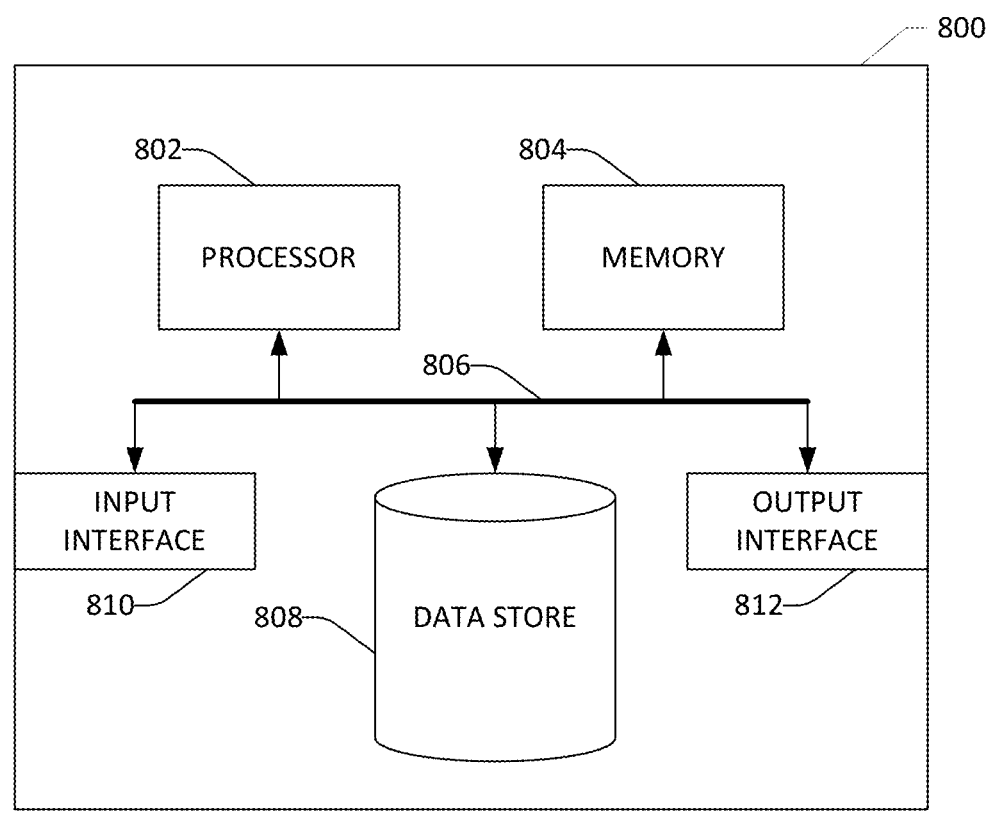
FIG. 8 illustrates an exemplary computing device.

Referring now to FIG. 8, a high-level illustration of an exemplary computing device 800 that can be used in accordance with the systems and methodologies disclosed herein is illustrated. For instance, the computing device 800 may be utilized to identify whether a feature in a CCD image has a manmade surface or a natural surface. For example, computing device 800 can operate as the image analyzer 140, the LCCD statistical model component 142, the median statistical model component 142, or the processor 144. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store operating parameters, required operating parameters, and so forth.

The computing device 800 additionally includes a data store 808 that is accessible by the processor 802 by way of the system bus 806. The data store 808 may include executable instructions, operating parameters, required operating parameters, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc., by way of the output interface 812.

Additionally, while illustrated as a single system, it is to be understood that the computing device 800 may be a distributed system. Thus, for instance, several devices may be in communication by way of a network connection and may collectively perform tasks described as being performed by the computing device 800.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. The terms "component" and "system" are also intended to encompass hardware configured to cause certain functionality to be performed, where such hardware can include, but is not limited to including, Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

What has been described above includes examples of one or more embodiments. It is, of course, not possible to describe every conceivable modification and alteration of the above structures or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. An image processing system comprising:
    a single polarization synthetic aperture radar (SAR) imager, the single polarization SAR imager configured to capture a plurality of single polarization SAR images of a scene, the SAR images each comprising pixels; and
    a processor programmed with instructions that, when executed by the processor, cause the processor to:
        generate a long term coherent change detection (LCCD) image from a first SAR image in the plurality of single polarization SAR images and a second SAR image in the plurality of single polarization SAR images; and
        analyze the LCCD image and label a first pixel in the LCCD image as corresponding to a paved roadway.

2. The image processing system of claim 1, wherein the first SAR image is generated at a first time and the second SAR image is generated at a second time, wherein a time between the first time and the second time is of sufficient temporal duration such that pixels in the first SAR image are correlated with pixels in the second SAR image when a feature is manmade, and the pixels in the first SAR image are decorrelated with pixels in the second SAR image when the feature is natural.

3. The image processing system of claim 1, wherein the processor utilizes coherent change detection (CCD) to determine a value of the first pixel in the LCCD image.

4. The image processing system of claim 3, wherein the value of the first pixel in the LCCD image is correlated.

5. The image processing system of claim 1, wherein the processor is further programmed with instructions that, when executed by the processor, cause the processor to generate a median image from the plurality of SAR images.

6. The image processing system of claim 5, wherein the processor is further programmed with instructions that, when executed by the processor, cause the processor to determine a plurality of SAR products in the plurality of SAR images.

7. The image processing system of claim 6, wherein the SAR products include different types of features and classes in the scene, wherein the features and classes include the paved roadway.

8. The image processing system of claim 6, wherein the processor is further programmed with instructions that, when executed by the processor, cause the processor to segment the median image into a first plurality of superpixels, wherein the first plurality of superpixels includes a first superpixel, and the first plurality of superpixels are segmented in accordance with the plurality of SAR products.

9. The image processing system of claim 8, wherein the processor is further programmed with instructions that, when executed by the processor, cause the processor to segment the LCCD image into a second plurality of superpixels, wherein the second plurality of superpixels includes a second superpixel, wherein the second superpixel is of the same size and homogeneity as the first superpixel.

10. The image processing system of claim 9, wherein the processor is further programmed with instructions that, when executed by the processor, cause the processor to compute a first probability of the first superpixel being a terrain class.

11. The image processing system of claim 10, wherein the processor is further programmed with instructions that, when executed by the processor, cause the processor to compute a second probability of the second superpixel being a terrain class.

12. The image processing system of claim 11, wherein the processor is further programmed with instructions that, when executed by the processor, cause the processor to fuse the first probability with the second probability to generate an in-class terrain probability, the in-class terrain probability indicating that the first pixel corresponds to the paved roadway.

13. A method, comprising:
  forming a LCCD image, wherein the LCCD image being formed from a coherent change detection (CCD) operation between a first plurality of pixels in a first single polarization synthetic aperture radar (SAR) image and a second plurality of pixels in a second single polarization SAR image, the first SAR image and the second SAR image are of a same scene and are included in a plurality of SAR images, wherein the first single polarization SAR image is captured at a first instance of time and the second SAR image is captured at a second instance of time, a duration of time between the first instance of time and the second instance of time is of sufficient temporal duration such that pixels in the first SAR image are correlated with pixels in the second SAR image when the feature is manmade, and the pixels in the first SAR image are decorrelated from the pixels in the second SAR image when the feature is natural;
  generating a first superpixel in the LCCD image; and
  classifying the first superpixel to be a paved road.

14. The method of claim 13, further comprising generating a median image from the plurality of SAR images.

15. The method of claim 14, further comprising:
  computing a plurality of SAR products from the plurality of SAR images, wherein the plurality of SAR products include the paved roadway and a dirt track.

16. The method of claim 15, further comprising:
  segmenting the median image into a first plurality of superpixels, wherein the first plurality of superpixels includes a second superpixel; and
  segmenting the LCCD image into a second plurality of superpixels, wherein the second plurality of superpixels includes the first superpixel, and the segmenting of the median image and the LCCD image being performed based upon homogeneous regions in the median image and the LCCD image being identified based upon the SAR products.

17. The method of claim 16, further comprising:
  computing a first probability of the first superpixel including terrain corresponding to the paved roadway;
  computing a second probability of the second superpixel including the terrain corresponding to the paved road; and
  fusing the first probability and the second probability to indicate a final probability of the first superpixel includes the paved road terrain.

18. A computer-readable storage medium comprising instructions that, when executed by a processor, cause the processor to perform acts comprising:
  receive a first single polarization synthetic aperture radar (SAR) image, the first single polarization SAR image including a first plurality of pixels;
  receive a second single polarization SAR image, the second single polarization SAR image including a second plurality of pixels, wherein the first SAR image and the second SAR image are of the same scene and are included in a plurality of SAR images;
  form a LCCD image product, wherein the LCCD image being formed from a coherent change detection (CCD) operation between the first plurality of pixels and the second plurality of pixels, wherein the first SAR image is captured at a first instance of time and the second SAR image is captured at a second instance of time, a duration of time between the first instance of time and the second instance of time is of sufficient temporal duration such that pixels in the first SAR image are correlated with pixels in the second SAR image when the feature is manmade, and the pixels in the first SAR image are decorrelated with pixels in the second SAR image when the feature is natural.

19. The computer-readable storage medium of claim 18, the acts performed by the processor further comprising:
  generating a median image from the plurality of SAR images, the plurality of SAR images depict a plurality of SAR products, the plurality of the SAR products have respective radar cross sections (RCSs) for different types of terrain and features encountered in the scene, wherein the features include a paved road and a dirt track;
  segmenting the median image into a first plurality of superpixels, wherein the first plurality of superpixels includes a first superpixel; and
  segmenting the LCCD image into a second plurality of superpixels, wherein the second plurality of superpixels includes a second superpixel, and the segmenting of the median image and the LCCD image being performed based upon homogeneous regions in the median image and the LCCD image being identified based upon the SAR products.

20. The computer-readable storage medium of claim 19, the acts performed by the processor further comprising:
  computing a first probability of the first superpixel including terrain corresponding to the paved road;
  computing a second probability of the second superpixel including the paved road terrain; and
  fusing the first probability and the second probability to indicate a final probability of the first superpixel includes the paved road terrain.

* * * * *